United States Patent [19]

Crook

[11] Patent Number: 4,928,783

[45] Date of Patent: May 29, 1990

[54] WELL BOREHOLE SOUND SOURCE

[75] Inventor: Troy N. Crook, Houston, Tex.

[73] Assignee: Exxon Production Research Company, Houston, Tex.

[21] Appl. No.: 355,233

[22] Filed: May 22, 1989

[51] Int. Cl.$^5$ .............................................. G01V 1/00
[52] U.S. Cl. .................................... 181/106; 181/113; 367/85
[58] Field of Search .................. 181/106, 113; 367/83, 367/85, 81, 144

[56] References Cited

U.S. PATENT DOCUMENTS

| | | | |
|---|---|---|---|
| Re. 32,463 | 7/1987 | Westlake et al. | 367/83 |
| 2,281,751 | 5/1942 | Cloud | 181/0.5 |
| 2,898,084 | 8/1959 | Eckel et al. | 255/1 |
| 3,979,140 | 9/1976 | Silverman et al. | 181/120 |
| 3,993,974 | 11/1976 | Silverman et al. | 340/15.5 |
| 4,211,300 | 7/1980 | Miller | 181/120 |
| 4,246,979 | 1/1981 | Thomson et al. | 181/120 |
| 4,252,209 | 2/1981 | Silverman | 181/106 |
| 4,472,794 | 9/1984 | Chelminski | 367/144 |
| 4,503,929 | 3/1985 | Farris et al. | 181/118 |
| 4,569,412 | 2/1986 | Bouyoucos et al. | 181/119 |
| 4,682,309 | 7/1987 | Dedole et al. | 367/146 |
| 4,798,261 | 1/1989 | Chelminski | 181/120 |

FOREIGN PATENT DOCUMENTS 2147700B 4/1986 United Kingdom.

OTHER PUBLICATIONS

"Sandia's downhole seismic tool nears commercialization", Oil & Gas Journal, Oct. 19, 1987, pp. 26, 27.
"Seismic-While-Drilling", Oil & Gas Journal, Feb. 27, 1989, p. 71, Borehole Seismic Energy Source, Proposal by HP Applications, Lakewood, Colorado, Oct. 1, 1982.

Primary Examiner—Charles T. Jordan
Assistant Examiner—J. Woodrow Eldred
Attorney, Agent, or Firm—Keith A. Bell

[57] ABSTRACT

A sound source capable of generating high energy acoustic pulses is lowered into a well borehole. A chamber of high pressure air in the source provides the energy for the pulses. A firing mechanism in the source is armed using increased pressure on the drilling mud in the well borehole. The pressurized mud is stored in a chamber in the source having closable ports. When the firing mechanism is operated, the ports are open, forcing the mud from the source into the borehole mud column and causing a cavitation zone in the mud at the ports. When the cavitation zone collapses, an acoustic energy pulse is formed. Pulses may be formed in this manner at the same depth or a number of depths in the well bore during a single run of the source in the well.

35 Claims, 5 Drawing Sheets

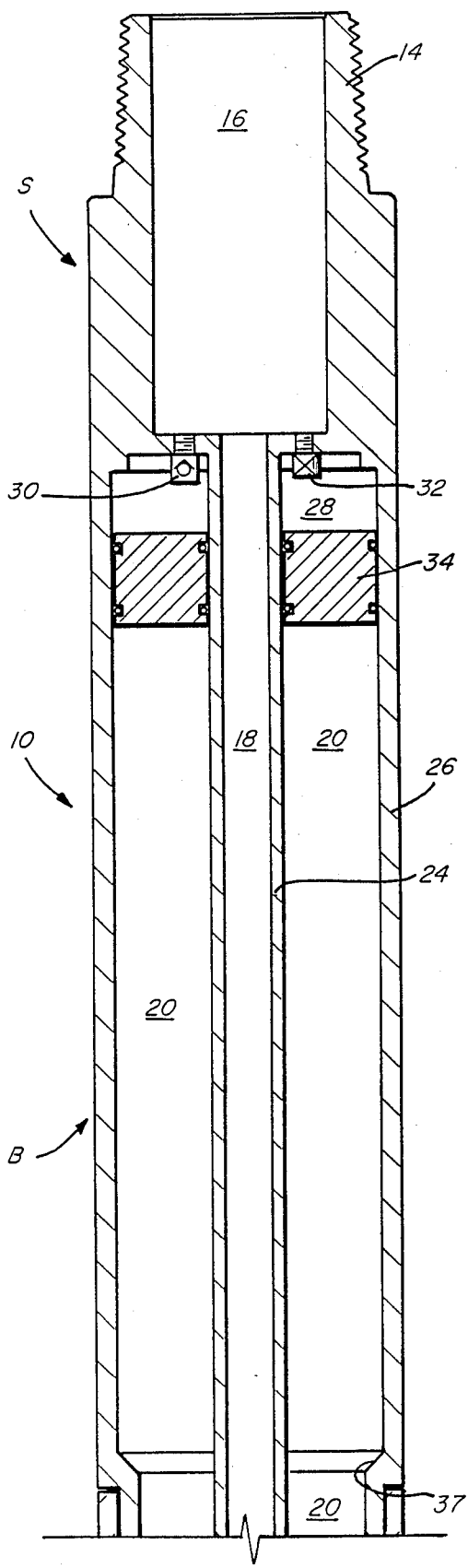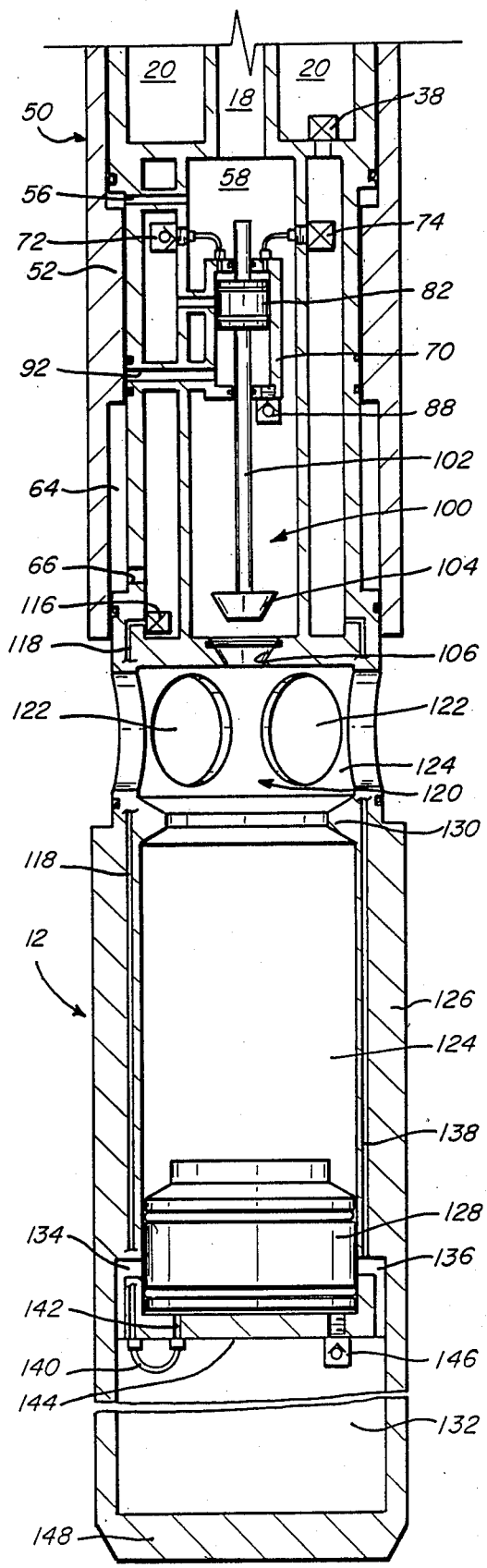
FIG. 4A
FIG. 4B

WELL BOREHOLE SOUND SOURCE

BACKGROUND OF INVENTION

1. FIELD OF INVENTION:

The present invention relates a sound source for generating acoustic pulses in a well borehole.

2. DESCRIPTION OF PRIOR ART:

It has been desirable to be able to perform seismic exploration of subsurface formations around a well borehole and beneath the borehole. Conventional seismic exploration of the formations surrounding and below boreholes was done using vertical seismic profiling (VSP) techniques. Typically, shots were fired in shallow boreholes, and seismic waves recorded by a detector lowered into the deep borehole on a logging cable and positioned at successive depths. One shot was fired for each depth. One trace was recorded representing the direct arrivals and reflections that could be observed by a detector at the surface from each shot. If multiple offsets were desired, several shots had to be fired at different radial distances from the borehole, and this procedure repeated as the detector was moved to different depths in the borehoe. A complete multiple offset VSP survey of a borehole was a very time-consuming operation and thus was not done very often because of the expense involved.

It has long been known that in theory the shots could be detonated in the deep borehoe, and multiple detectors could be located at the surface to record all the offsets of a multiple offset VSP simultaneously. This procedure has been named "Reversed VSP." The reason this has not become an operational technique is the difficulty of getting a suitable deep hole sound source. Explosives might be used; however, only a small number of shots can be lowered in the hole at one time. A complete survey involves many shots and would require many trips into the hole using conventional explosive devices such as perforating gun technology. Additionally, due to the limitation on the size of charge that can be detonated in the borehole, several shots would probably be required at each depth. This would further multiply the number of trips into the hole.

Acoustic pulses could be generated by piezoelectric crystals and other devices lowered into the borehole by a well logging cable. The cable could supply the devices with continuous electrical power and avoid the problem of making multiple trips into and out of the hole. The principal problem with this technique is that the amount of power that could be transmitted through a logging cable would be low, typically about 200 to 300 watts. The pulses generated would thus be much lower in energy than those generated by explosives; or, alternatively very long time periods would be required to store up enough energy in the downhole tool to discharge into a high-energy pulse. In either case, very long periods of time would be required at each depth in the borehole to transmit sufficient energy to produce acceptable signal-to-noise ratios at the detectors on the surface. Examples of such a seismic source receiving and storing operating power from the surface via a conduit are U.S. Pat. No. 3,979,140 and U.S. Pat. No. 4,682,309.

There have been attempts in the prior art to form acoustic signals in well boreholes. For example, in U.S. Pat. No. 2,898,084 a drill string was lifted so that a rotary drill bit was raised from of the well bottom. During such lifting, telescoping inner and outer members armed a seismic shock source. When lifting force was released, surfaces on the inner and outer members transferred the weight of the drill string to the drill shortly after the drill bit had hit the well bore bottom. A disadvantage with this was that the rotary drill bit was being used as a hammer or ram against the well bottom. Other hammer and anvil techniques were disclosed in U.S. Pat. No. 4,569,412 and U.K. Pat. No. 2,147,700B.

Another method, based on the "water hammer" effect, was to temporarily block the flow of drilling mud, then release flow. The surge in flow caused an acoustic pulse. Examples of this technique were disclosed in U.S. Pat. Nos. 3,993,974 and 4,252,209.

SUMMARY OF INVENTION:

Briefly, the present invention comprises a new and improved seismic or sound source for generating acoustic pulses in well boreholes. A body member is attached to a lower end of a drill string and lowered into a well borehole filled with drilling fluid, commonly termed drilling mud. A reservoir in the body member contains a compressed gas, usually air. When a desired depth in the borehole is reached, the pressure in the column of drilling mud is increased. The increased drilling mud pressure further compresses the gas in the reservoir and causes a charge of drilling mud to be stored in a chamber in the body member. At the same time, a movable shuttle in the body member adjacent the chamber is armed. The movable shuttle is then triggered, forcing the charge of mud in the chamber out through mud ports in the body member into the well borehole. A shoulder in the body member adjacent the chamber limits motion of the shuttle. Motion of the charge of mud continues, however, for an interval after shuttle motion ceases. This causes a cavitation zone in the mud adjacent the mud ports. When the weight of drilling mud collapses in the cavitation zone, a seismic impulse is formed. Seismic impulses may be formed in this manner at the same depth, or a successive number of depths, repeatedly during a single run of the drill string in the well boreholes.

BRIEF DESCRIPTION OF THE DRAWINGS

FIGS. 4A and 4B are elevation views, taken partly in cross-section, of the apparatus of FIGS. 1A and 1B, respectively, with portions thereof in different positions.

DESCRIPTION OF PREFERRED EMBODIMENT

Figure 1A:
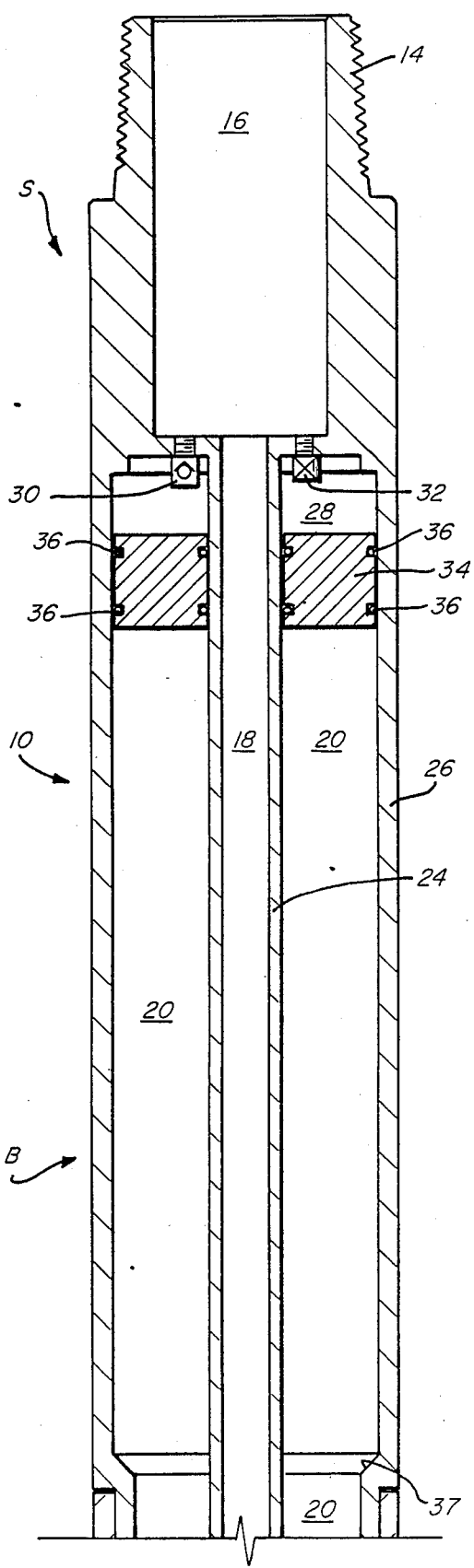
FIGS. 1A and 1B are elevation views, taken partly in cross-section, of a seismic source apparatus according to the present invention.
Figure 1B:
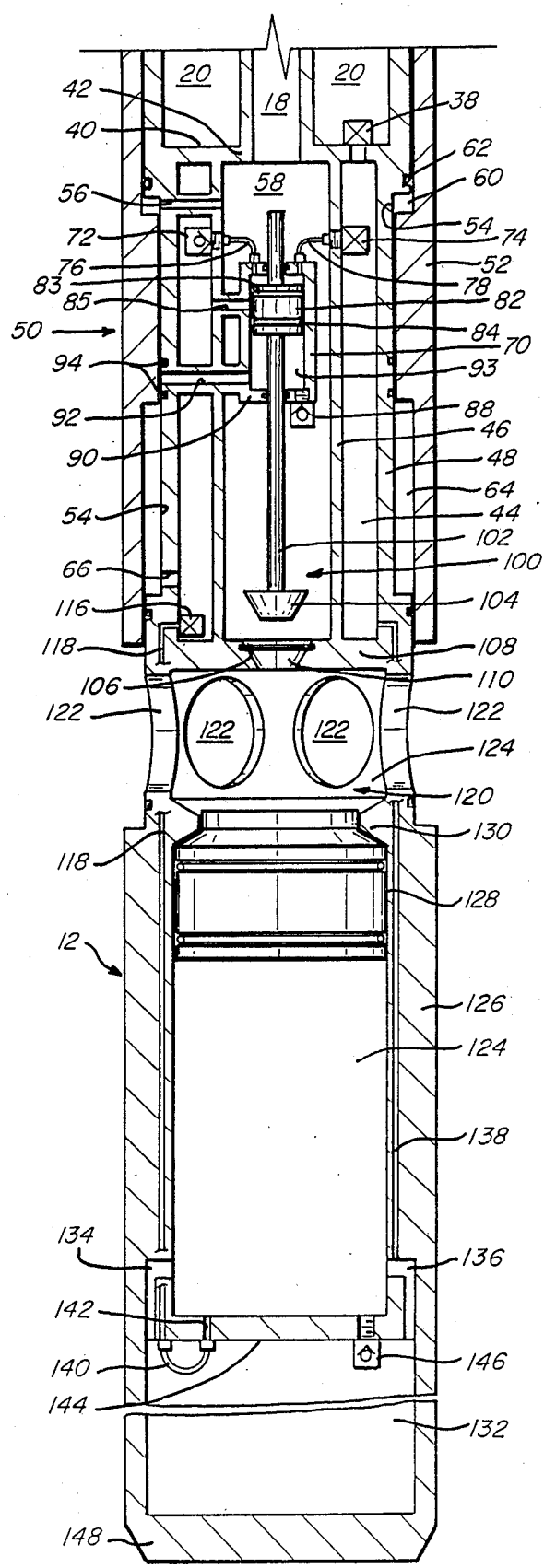

In the drawings, the letter S (FIGS. 1A and 1B) designates generally a seismic source according to the present invention for forming acoustic impulses in a well borehole filled with drilling mud or fluid. The source S includes a body member B composed of an upper section 10 (FIG. 1A) and a lower section 12 (FIG. 1B).

The upper section 10 has a threaded pin connection 14 formed at an upper end thereof for attaching the source S at the lower end of a conventional drill string of pipe. An upper opening 16 is formed in the upper section 10 internally of the pin connection 14 to receive drilling mud pumped through the drill string in the conventional manner.

A central internal tubular passageway 18 (FIGS. 1A and 1B) is formed extending through the upper section 10 for conveying mud downwardly from the upper opening 16. A cylindrical upper reservoir 20 is formed in the upper section 10 between an inner wall 24 surrounding the passageway 18 and an outer wall 26. Upper reservoir 20 is charged with a suitable gas, usually air for reasons of economy, through a conventional charging port.

An upper portion 28 of upper reservoir 20 is in fluid communication with upper opening 16 through a check valve 30 and a control valve 32. The control valve 32, as well as the other control valves of the source S set forth below, are remotely controlled from the surface by coded acoustic pulses sent from conventional instrumentation at the wellhead through the column of drilling mud to conventional control instrumentation in the source S in the conventional manner. Such instrumentation may be located, suitably protected in the opening 16. The time of the seismic pulse formed in the source S is detected by a pressure detector and precision clock in the downhole instrumentation. This information is transmitted to the surface instrumentation by conventional coded acoustic pulses through the borehole mud column. This information can also be obtained by a geophone on the drill pipe at the surface with appropriate correction for the known acoustic velocity of the steel drill pipe.

An annular pressure containment shuttle 34 is movably mounted in the upper reservoir 20 about the inner wall 24. O-rings or other suitable seals 36 are provided for the purpose of fluid sealing against the inner wall 24 and the outer wall 26. A restraining shoulder 37 is formed in a lower portion of the upper reservoir 20 to limit downward movement of the pressure containment shuttle 34. A control valve 38 (FIG. 1B) is mounted in the upper reservoir 20 on a surface 40 of a wall 42. The wall 42 separates the upper reservoir 20 from an annular chamber 44 formed between cylindrical wall members 46 and 48.

A tubular containment sleeve 50 is mounted on the upper section 10 at its lower end. The containment sleeve 50 has an inner shoulder 52 which is slidably movable in a recessed surface section 54 of the upper section 10. A radially extending port 56 is formed extending outwardly from a mud valve chamber 58 to an annular space 60 formed between the containment sleeve 50 and the recessed surface 54. The annular space 60 is sealed at its upper end by an O-ring or other suitable seal 62.

The mud valve chamber 58 is in fluid communication with the central passageway 18 to receive drilling mud therefrom. The mud valve chamber 58 is located within the cylindrical wall member 46. An annular space 64 is formed between the surface 54 of the outer wall member 48 and the lower portion of the containment sleeve 50. The annular space 64 is suitably sealed in a like manner to the space 60. A port 66 formed in outer wall member 48 permits fluid communication between chamber 44 and space 64.

A mud valve cylinder 70 is mounted to the wall member 46 within the mud valve chamber 58. A check valve 72 and a control valve 74, which is remotely controlled in the manner indicated for control valve 32, are mounted with the wall member 46. The valves 72 and 74 are in fluid communication through conduits 76 and 78, respectively, with an upper portion 80 (FIG. 2B) of the mud valve cylinder 70. A mud valve piston 82 is mounted within the mud valve cylinder 70 having upper and lower sealing rings 83 and 84, respectively. A port 85 provides fluid communication between the interior of mud valve cylinder 70 and the annular chamber 44. A check valve 88 is mounted on a lower wall 90 of the mud valve cylinder 70 to permit fluid flow from the mud valve cylinder 70 to the mud valve chamber 58.

A radial port 92 permits fluid communication between a lower portion 93 of mud valve cylinder 70 and the recess 60 (FIG. 2B), depending upon the position of the container sleeve 50 (FIG. 1B). Suitable sealing rings 94 are mounted in the wall member 48 to seal the port 92.

Figure 2A:
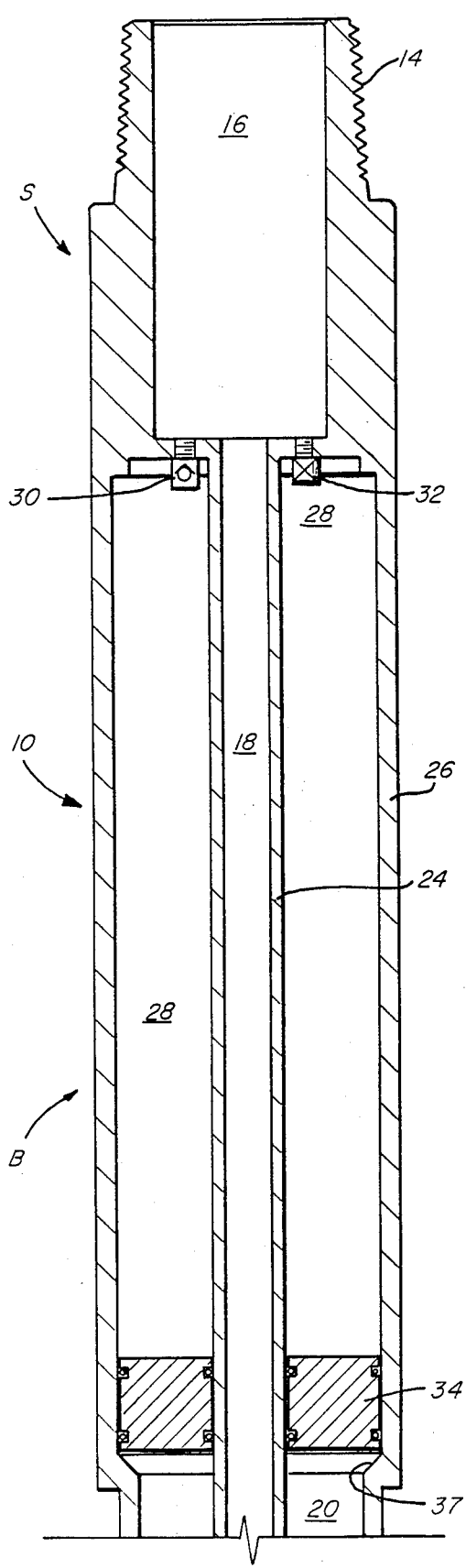
FIGS. 2A and 2B are elevation views, taken partly in cross-section, of the apparatus of FIGS. 1A and 1B, respectively, with portions thereof in different positions.
Figure 2B:
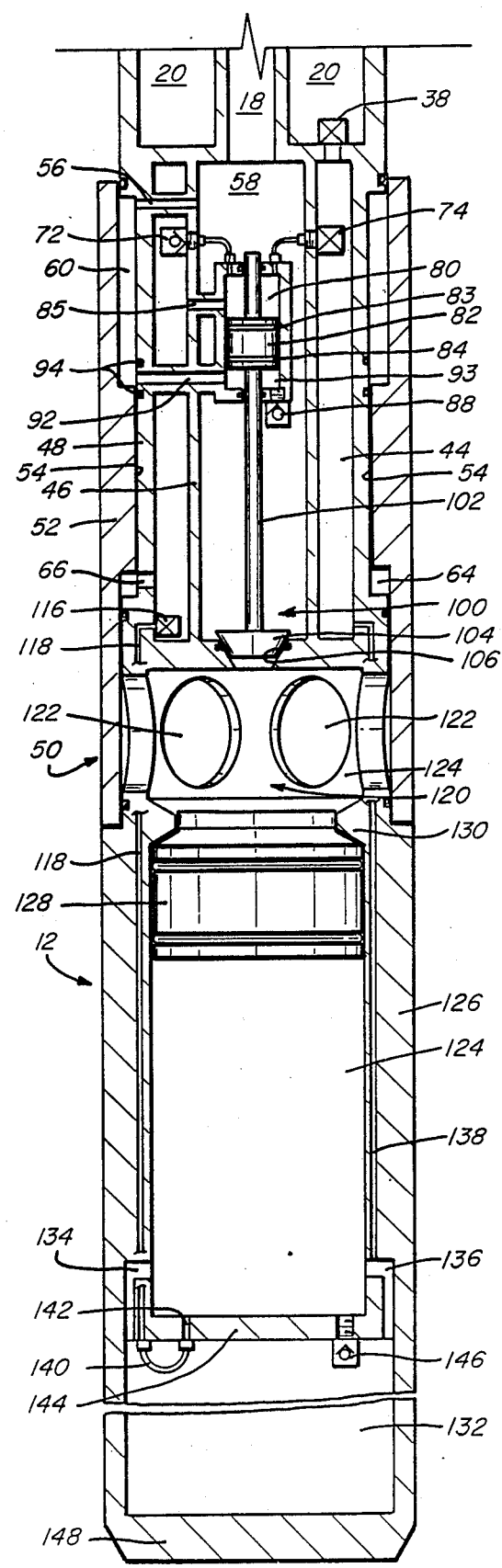

A mud valve 100 is composed of a valve stem 102 mounted with the valve piston 82 which extends through sealed ports at each end of the mud valve cylinder 70 and a plug member 104 which is adapted to seal against a tapered surface 106 formed in a lower wall member 108 of the upper section 10 adjacent an opening 110. Suitable seals are mounted in the tapered surface 106 to seal against the plug member 104 when it is in the closed position (FIG. 2B).

A remotely controlled valve 116 is mounted at a lower portion of the chamber 44 for fluid communication through a conduit 118 with portions of the lower section 12, for reasons to be set forth below. Between the upper section 10 and the lower section 12 of the source S is a mud chamber 120 which has outlets for mud through mud ports 122 formed in a wall 124 in the body member B.

Figure 3A:
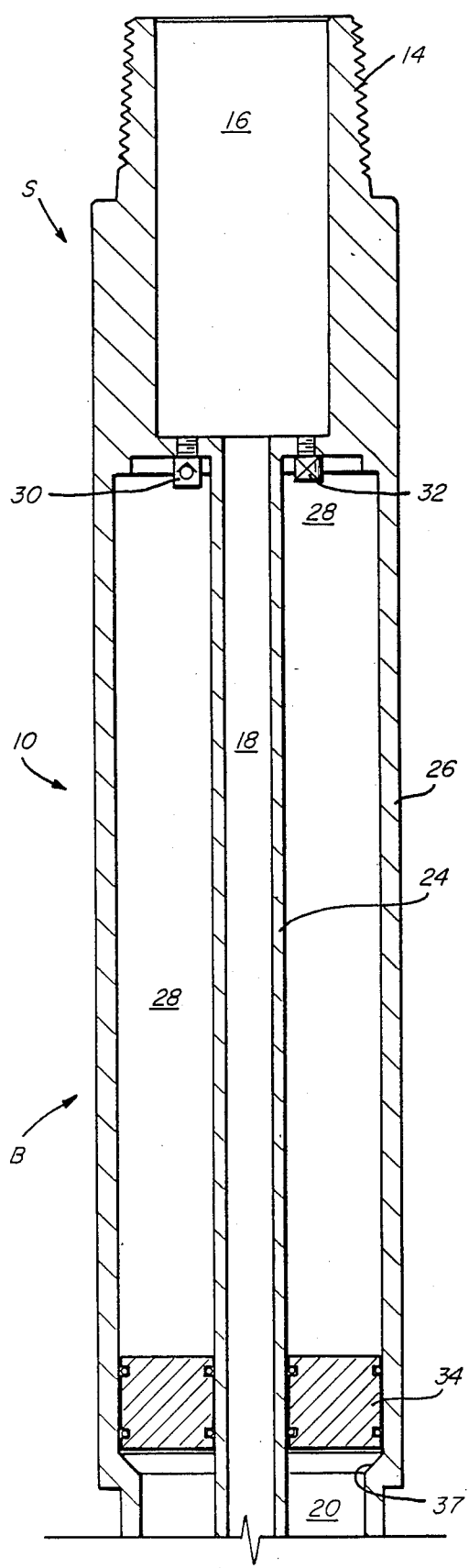
FIGS. 3A and 3B are elevation views, taken partly in cross-section, of the apparatus of FIGS. 1A and 1B, respectively, with portions thereof in different positions.
Figure 3B:
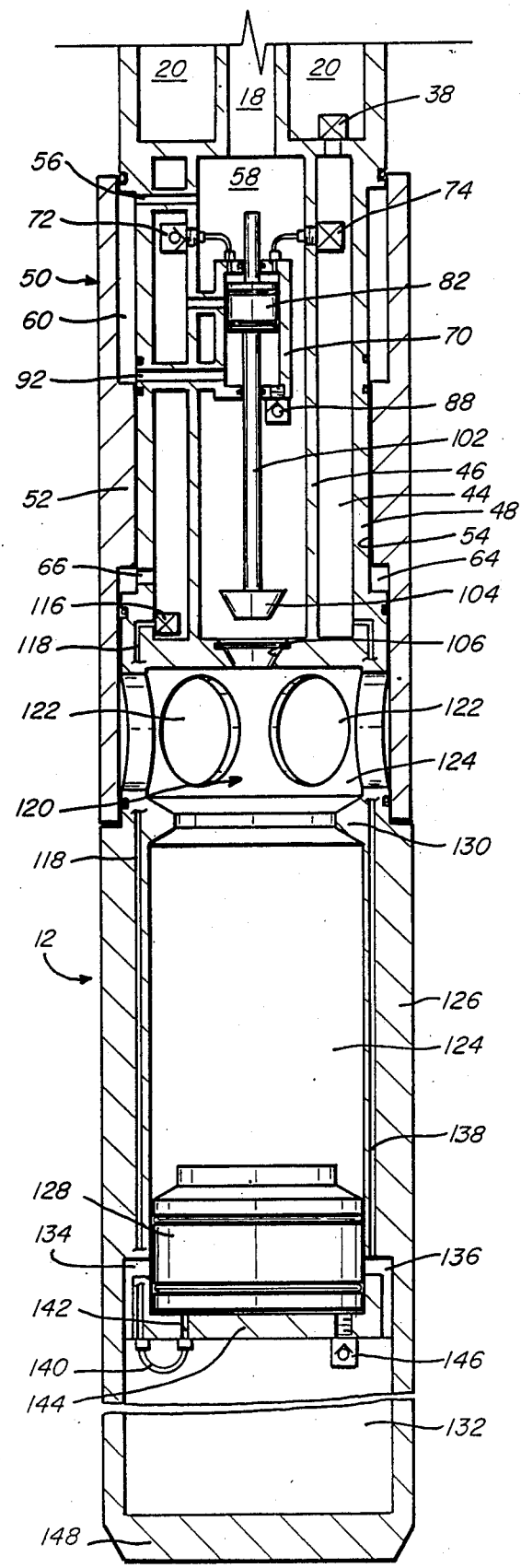

The lower section 12 extends beneath the mud chamber 120 and includes a cylindrical firing chamber 124 formed within an outer wall 126. A firing shuttle 128 is slidably movable within the firing chamber 124 between an upper position (FIG. 1B) and a lower position (FIG. 3B). An inwardly extending tapered decelerating shoulder 130 is formed at an upper end of the lower section 12 adjacent the mud chamber 120 to limit upper movement of the firing shuttle 128.

A second or lower reservoir 132 is formed within a lower portion of the lower section 12. The lower reservoir 132 is also simultaneously charged with a suitable gas, usually air, through a conventional sealable charging port. The second air reservoir 132 is in fluid communication through a number of ports, exemplified as 134 and 136, with the firing chamber 124 unless the firing shuttle is in its lower position (FIG. 3B). The lower air reservoir 132 is also in fluid communication through port 136 and a conduit 138 formed in an outer wall 126 of lower section 12 with the chamber 44 in the upper section for pressure equalization purposes.

The conduit 118 extending from control valve 116 in the upper section 10 is connected by a conduit or tube 140 and a port 142 formed in a lower wall 144 to the firing chamber 124. A check valve 146 is mounted in the wall 144 to permit fluid exit into the air reservoir 132 from the firing chamber 124. A lower wall 148 of bottom section 12 forms a closure for the lower reservoir 132.

In the operation of the present invention, upper reservoir 20 and lower reservoir 132 are charged with air to a suitable pressure, for example 2000 psi, and the source S is attached at pin connection 14 to the lower end of a drill string. The source S and the drill string are then lowered into the well bore. As the source goes into the well borehole, control valves 38, 74 and 116 are in the closed position. Further, the containment sleeve 50 is in the upper position (FIG. 1B) so that drilling mud may circulate freely through the open ports 122.

At some depth in the well bore which is shallower than a depth where the hydrostatic pressure of the drilling mud equals the air pressure stored in reservoirs 20 and 132, lowering of the source S is stopped to fire a seismic shot or acoustic impulse. Control valve 74 is momentarily opened, allowing air pressure to close the mud valve 100 (FIG. 2B). After the mud valve piston 82 passes the port 85, the mud valve 100 is pushed downwardly by air entering the port 85, allowing control valve 74 to be closed. Any mud trapped in the space 93 below the mud valve piston 82 will be forced from the chamber 93 through the check valve 88.

With the mud valve 100 in the closed position (FIG. 2B), the pressure on the column of mud in the well borehole is increased by the rig pump at the surface to a suitable level above hydrostatic, such as for example, 2000 psi. This results in the source S being subject to a pressure of 2000 psi above normal hydrostatic pressure. The pressurized mud enters the upper portion 28 of the upper reservoir 20 through the check valve 30, forcing the pressure compensation shuttle 34 downwardly (FIG. 2A) to a position where the pressure in the lower portion of the reservoir 20 equals that of the mud in the upper portion 28 of the reservoir 20.

As the mud pressure rises above the air pressure in upper reservoir 20, mud enters the port 56, expanding the space 60 and forcing the containment sleeve downwardly to a position (FIG. 2B) where the mud ports 122 are sealed. As the containment sleeve 50 passes the port 92, mud begins to enter the mud piston cylinder space 93 beneath the mud valve piston 82, forcing the mud valve piston 82 upward.

When the mud valve piston 84 passes the port 85, the remaining air in the chamber 80 is forced out of the mud valve cylinder 70 through the check valve 72. With the port 85 now between the seals 83 and 84 on the mud valve piston 82, the mud valve piston 84 is retained in the open position (FIG. 3B).

With the mud valve 100 open, high pressure drilling mud enters the chamber 120 and forces the firing shuttle 128 downwardly into the firing chamber 124 to a bottom position (FIG. 3B), working against the air pressure in lower reservoir 132. As the firing shuttle 128 passes the ports 134 and 136, the remaining air below the firing piston 128 is forced into the lower reservoir 132 through the check valve 146. With the ports 134 and 136 between the seals on the firing shuttle, the firing shuttle remains at the bottom of the firing chamber 124. Control valve 38 is opened to allow the pressure to equalize between the upper reservoir 20 and the lower reservoir 132. The air pressure in both reservoirs is at this time now about 2000 psi above the hydrostatic pressure (FIG. 4B).

Figure 5A:
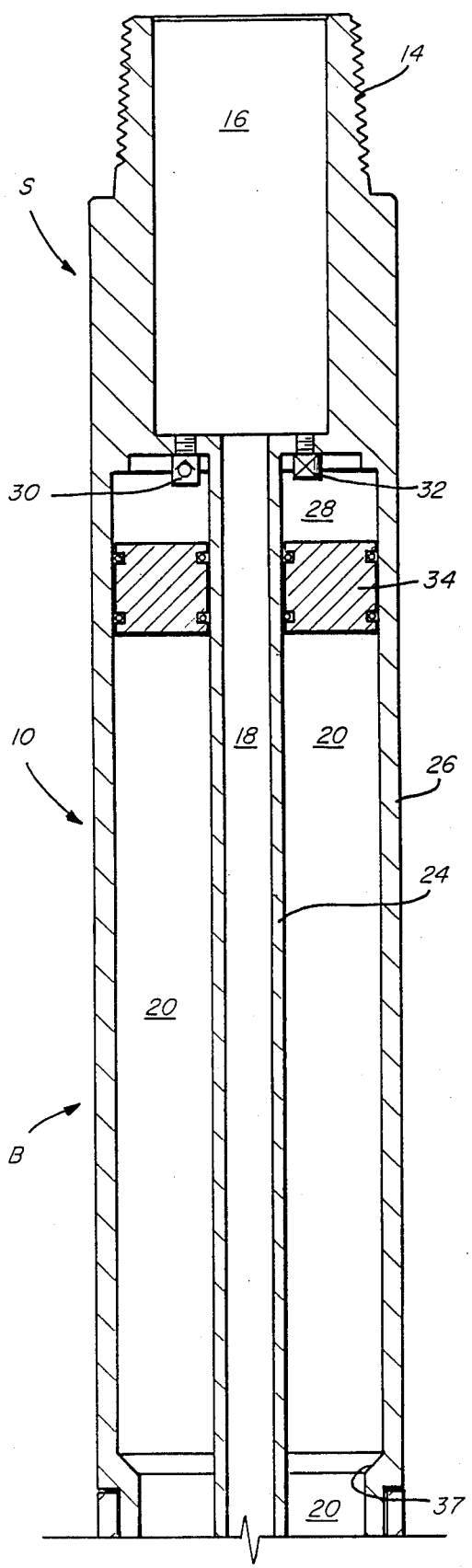
FIGS. 5A and 5B are elevation views, taken partly in cross-section, of the apparatus of FIGS. 1A and 1B, respectively, with portions thereof in different positions.
Figure 5B:
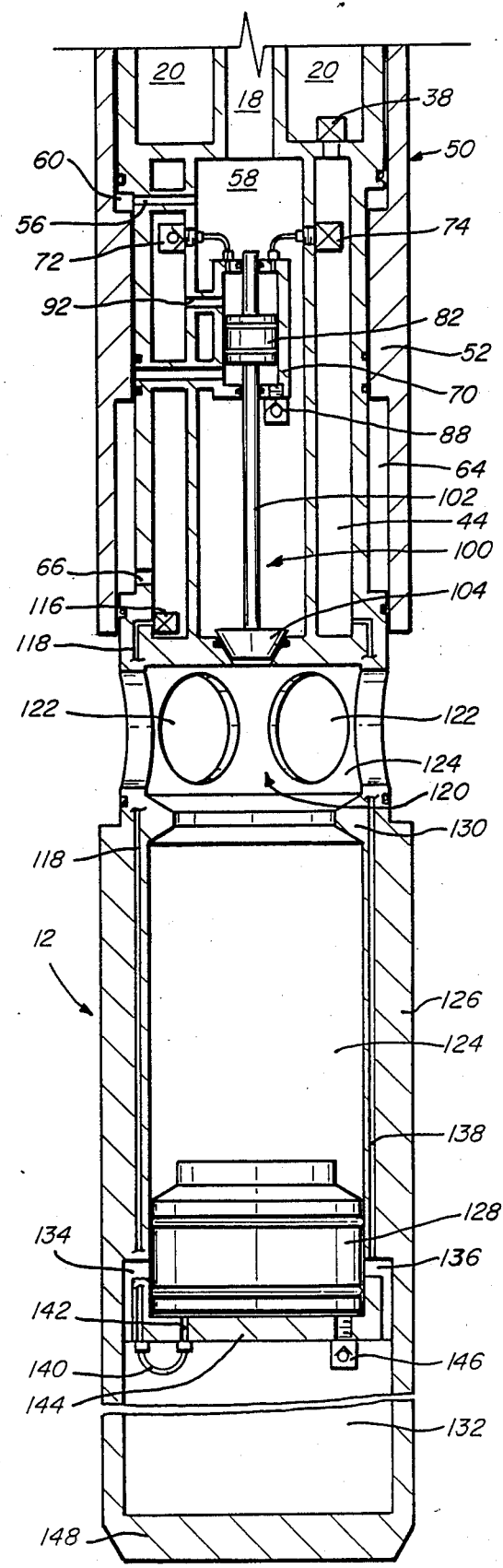

The pressure on the column of drilling mud in the borehole is now reduced to atmospheric pressure, reducing the ambient pressure at the source S in the well borehead to the hydrostatic pressure of the column of drilling mud above it. At this time, air pressure from lower reservoir 132 passes through port 66 into an annular space 64, forcing the containment sleeve upwardly to a position (FIG. 4B) opening the mud ports 122. Control valve 74 is opened momentarily again to move the mud valve 100 to its closed position (FIG. 5B), arming the seismic sources to form a seismic impulse when needed.

To fire the source S, control valve 116 is opened, permitting the pressurized air in the chamber 44 to pass through the conduit 118, tube 140 and port 142 into the firing chamber 124 beneath the firing shuttle 128, forcing the firing shuttle 128 above the ports 134 and 136. At this point, a large volume of pressurized air from the lower reservoir 132 enters the firing chamber 124 through the ports 134 and 136. The air from air reservoir 132 accelerates the firing shuttle 128 upwardly in the firing chamber 124. As the firing shuttle 128 moves upwardly in the firing chamber 124, mud in the firing chamber 124 above the firing piston 128 is forced outwardly through the open mud ports 122 upwardly into the drilling mud column in the wellbore, causing the mud column to move upwardly at an increasing velocity. As the firing shuttle 128 nears the decelerating shoulder 130, the inwardly extending shoulder 130 limits drilling mud flow to reduce the velocity of the upwardly travelling shuttle 128. When the firing shuttle 128 contacts the decelerating shoulder 130, movement of the firing shuttle 128 is stopped. However, the mud column in the wellbore will continue to move upwardly briefly for a moment, causing a cavitation zone to be formed adjacent the mud ports 122. Thereafter, the mud column decelerates and begins downward movement, collapsing the cavitation zone and creating an acoustic impulse which is transmitted into the earth formations adjacent the well borehole. The seismic source S is now prepared to repeat the foregoing sequence, forming another seismic impulse at the same location in the well bore. Alternatively, the source S can be moved downwardly in the well bore to a depth for another shot or sequence of shots.

Because of the upward movement of the firing shuttle 128 during the formation of an acoustic impulse, the pressure in the lower reservoir 132 is somewhat lower than it originally was. This, however, permits the containment sleeve 50 to be lowered during the next shot cycle without having to use a mud pressure higher than that of the preceding shot cycle.

Caution should be exercised in moving the sound sources downwardly in the well to a point where the hydrostatic pressure of the column of drilling mud exceeds the pressure in the lower reservoir 132. Should that occur, the containment sleeve 50 could not be moved. Further, the mud valve 100 would be held open and could not be closed.

Once the source S has reached the bottom of the well borehole and before returning the source S to the surface, the pressure in the upper reservoir 20 and lower reservoir 132 can be lowered to a safe value by opening valves 32 and 38. Alternatively, the pressure in the reservoirs 20 and 132 may be incrementally reduced as the source S is being removed from the well, permitting additional seismic pulses or shots to be made as the source S is being removed from the well borehole.

The foregoing disclosure and description of the invention are illustrative and explanatory thereof, and various changes in the size, shape and materials, as well

I claim:

1. A seismic source for forming acoustic pulses in drilling fluid in a well borehole, comprising:
   reservoir means for storing a compressed gas having a first pressure;
   a body member housing said reservoir means and having mud ports;
   pressurizing means responsive to an increased pressure in the drilling fluid for further compressing the gas in said reservoir means to a second pressure greater than said first pressure;
   chamber means in said body member for receiving drilling fluid from the well borehole and storing a charge of drilling fluid;
   shuttle means for moving in said body member responsive to the compressed gas at said second pressure in said reservoir means to displace the charge of drilling fluid through said mud ports;
   control means for arming said shuttle means; and
   shoulder means for limiting movement of said shuttle means, thereby causing a cavitation zone in the drilling fluid adjacent said mud ports, which zone when collapsed forms a seismic impulse in the drilling fluid.

2. The seismic source of claim 1, further including:
   firing means for firing said shuttle means.

3. The seismic source of claim 1, wherein said reservoir means comprises:
   an upper reservoir for storing a compressed gas further compressible in response to the increased pressure in the drilling fluid.

4. The seismic source of claim 3, further including:
   a pressure compensation shuttle in said upper reservoir moving in response to the increased pressure in the drilling fluid to further compress the compressed gas in said upper reservoir.

5. The seismic source of claim 1, wherein said reservoir means comprises:
   a lower reservoir for storing a compressed gas further compressible in response to the increased pressure in the drilling fluid.

6. The seismic source of claim 1, wherein said reservoir means comprises:
   a lower reservoir for storing a compressed gas further compressible in response to the increased pressure in the drilling fluid; and
   an upper reservoir for storing a compressed gas further compressible in response to the increased pressure in the drilling fluid.

7. The seismic source of claim 6, further including:
   means for equalizing the gas pressure in said upper and lower reservoirs.

8. The seismic source of claim 6, wherein:
   said lower reservoir and said chamber means are connected by at least one fluid port; and
   said shuttle means is movable in said chamber means to displace mud therefrom.

9. The seismic source of claim 8, further including:
   said shuttle means being armed when in position when closing said fluid port.

10. The seismic source of claim 9, further including:
    firing means communicating gas from said upper reservoir to displace said shuttle means from the position closing said fluid port.

11. The seismic source of claim 1, further including:
    said shoulder means being formed in said body member at an upper end of said chamber means.

12. The seismic source of claim 1, further including:
    said mud ports being formed in said body member adjacent said shoulder member.

13. The seismic source of claim 1, further including:
    a containment sleeve movably mounted with said body member to selectively open and close said mud ports.

14. The seismic source of claim 13, wherein:
    said control means comprises means moving said containment sleeve to open and close said mud ports.

15. The seismic source of claim 1, further including:
    a mud valve movably mounted with said body member to allow drilling fluid to enter said chamber means.

16. The seismic source of claim 15, wherein:
    said control means comprises means moving said mud valve.

17. The seismic source of claim 1, further including:
    means attaching said body member at a lower end of a drill string for lowering said body member in the well borehole.

18. A method of forming acoustic pulses in drilling fluid in a well borehole, comprising the steps of:
    storing a charge of drilling fluid in a chamber in a body member in the well borehole;
    increasing the pressure in the well borehole to arm a shuttle member adjacent the chamber with a gas compressed in part by means internal to said body member;
    firing the shuttle member; and
    displacing the charge of drilling fluid from the chamber into the well borehole.

19. The method of claim 18, further including the step of:
    lowering the body member to a desired depth in the well borehole prior to said step of storing a charge.

20. The method of claim 19, further including the steps of:
    lowering the body member to a different depth in the well borehole subsequent to said step of displacing the charge of drilling fluid; and
    thereafter repeating said steps of storing a charge, increasing the pressure, firing the shuttle member, and displacing the charge.

21. A seismic source for forming acoustic pulses in drilling fluid in a well borehole, comprising:
    reservoir means for storing a compressed gas;
    chamber means for storing a charge of drilling fluid;
    shuttle means for displacing the charge of drilling fluid from said chamber means into the drilling fluid in the well borehole;
    compressor means for further pressurizing said compressed gas in response to an increased drilling fluid pressure in the well borehole thereby arming said shuttle means; and
    means for firing said shuttle means.

22. The seismic source of claim 21, further including:
    a body member housing said chamber means.

23. The seismic source of claim 22, wherein:
    said body member has mud ports formed therein adjacent said chamber means.

24. The seismic source of claim 23, further including:
    containment sleeve means for selectively opening and closing said mud ports.

25. The seismic source of claim 22, further including:

means attaching said body member at a lower end of a drill string for lowering said body member in the well borehole.

26. The seismic source of claim 22, further including:
mud valve means for allowing drilling fluid to enter said chamber means.

27. The seismic source of claim 22, further including:
reservoir means in said body member for storing a compressed gas.

28. The seismic source of claim 27, wherein said means for arming comprises:
means for further compressing the gas in said reservoir means.

29. The seismic source of claim 22, further including:
shoulder means in said body member for limiting movement of said shuttle means, thereby causing a cavitation zone in the drilling fluid, which zone when collapsed forms a seismic impulse in the drilling fluid.

30. The seismic source of claim 29, wherein:
said body member has mud ports formed therein adjacent said chamber means.

31. The seismic source of claim 30, further including:
said shoulder means being formed in said body member at an upper end of said chamber means.

32. The seismic source of claim 30, further including:
said mud ports being formed in said body member adjacent said shoulder member.

33. A method of forming acoustic pulses in drilling fluid in a well borehole, comprising the steps of:
storing a charge of compressed gas having a first pressure in a reservoir in a body member in the well borehole;
storing a charge of drilling fluid in a chamber in said body member;
increasing the pressure in the well borehole so as to further compress the gas in said reservoir to a second pressure greater than said first pressure thereby arming a shuttle member adjacent the chamber;
utilizing said compressed gas at said second pressure to fire the shuttle member; and
displacing the charge of drilling fluid from the chamber into the well borehole.

34. The method of claim 33, further including the step of:
lowering the body member to a desired depth in the well borehole prior to said step of storing a charge of drilling fluid in said body member.

35. The method of claim 34, further including the steps of:
lowering the body member to a different depth in the well borehole subsequent to said step of displacing the charge of drilling fluid; and
thereafter repeating said steps of storing a charge of drilling fluid, increasing the pressure, firing the shuttle member, and displacing the charge of drilling fluid.

* * * * *